Nov. 8, 1966 C. E. DAVIS 3,283,663
HIGH SPEED MILLING APPARATUS
Filed Oct. 29, 1964 2 Sheets-Sheet 1
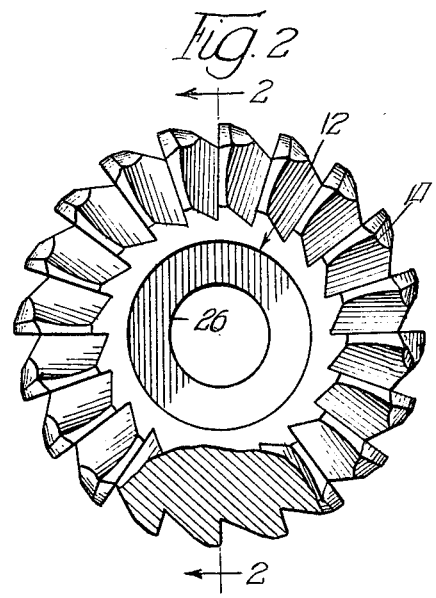
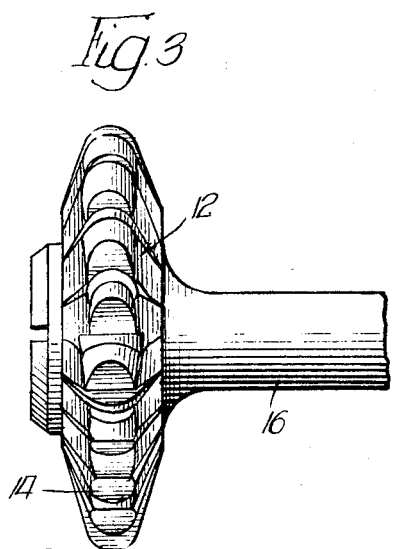
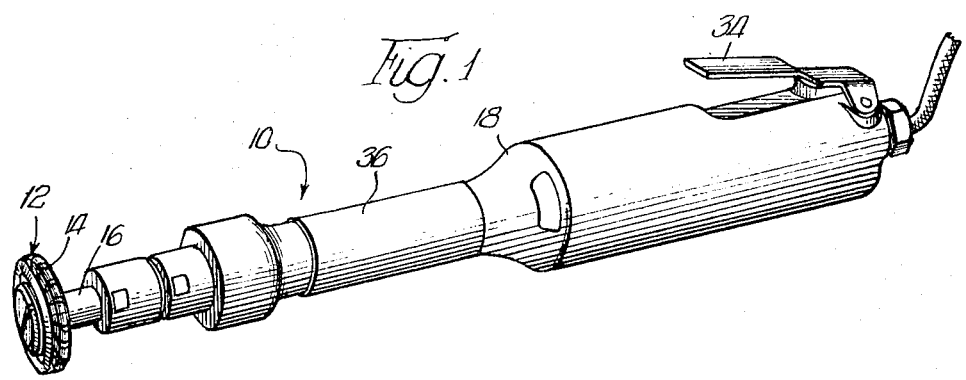
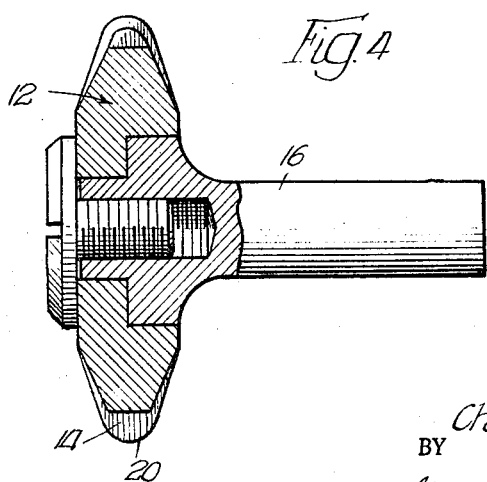
INVENTOR.
Charles E. Davis,
BY
Hume, Groen, Clement & Hume
Attys

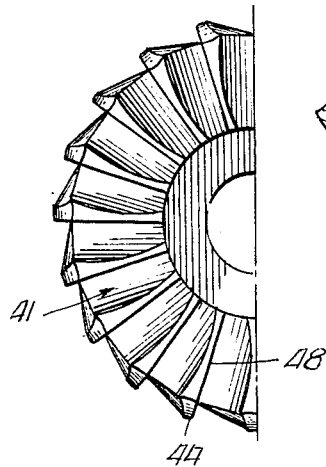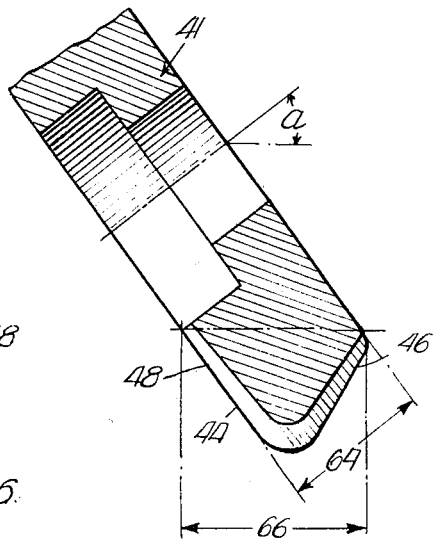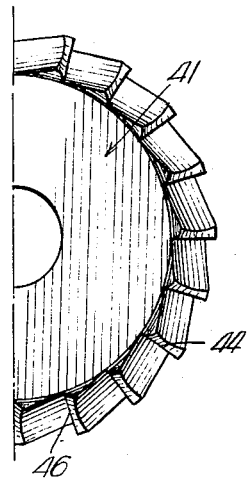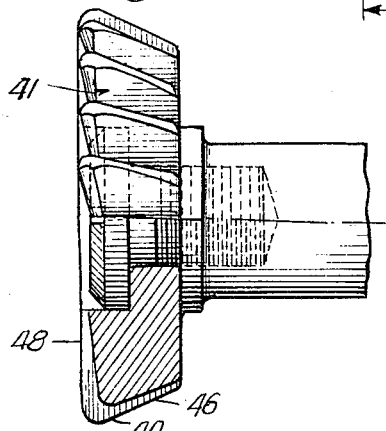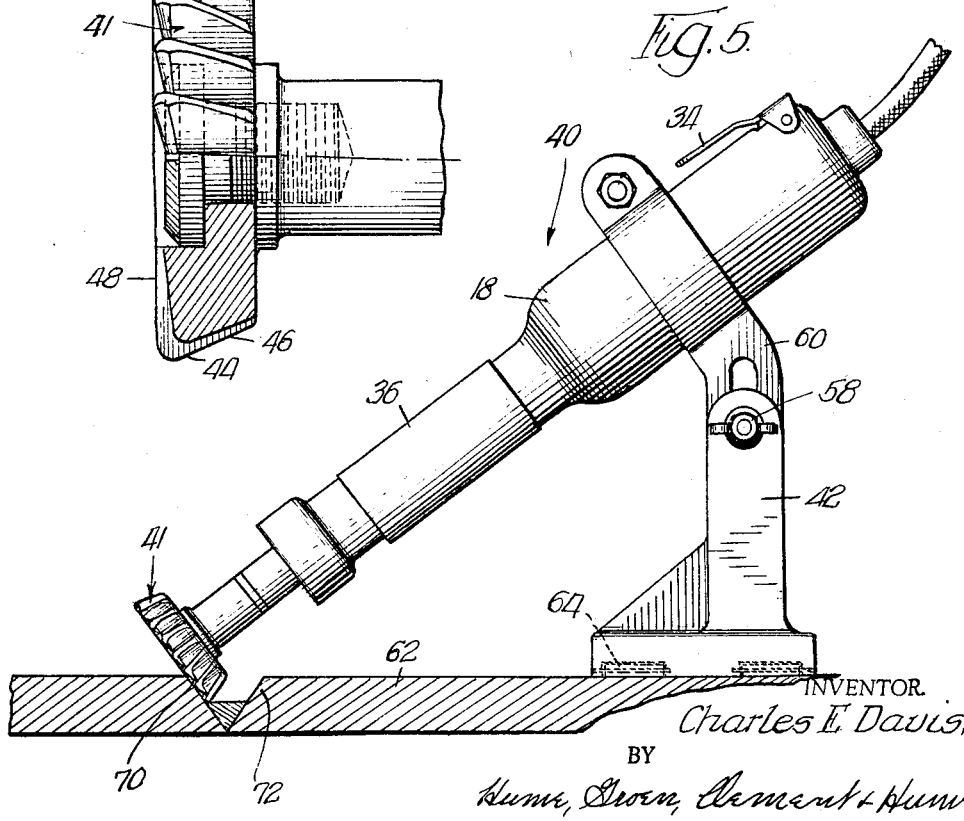

United States Patent Office 3,283,663
Patented Nov. 8, 1966

3,283,663
HIGH SPEED MILLING APPARATUS
Charles E. Davis, 1430 N. Lake Shore Drive,
Chicago, Ill.
Filed Oct. 29, 1964, Ser. No. 407,400
1 Claim. (Cl. 90—12)

The present invention relates to material removal and particularly to high speed milling apparatus.

The rapid increasing use of very hard or high strength metals, particularly in welded constructions, has created with it an increasing demand for more efficient metal removal tools. The current practice is to employ conventional abrasive grinding wheels. These wheels, if they cut very freely and without loading, usually have a short tool life. Further, they generate large amounts of heat which set up dangerous heat stresses. Such heat stresses cannot in the future be tolerated on any of our high reliability structures such as airplanes, airplane parts, space ships, missiles, deep diving submarines, nuclear power systems, etc.

There exists in this high reliability fabricating field a demand for high potential removal and/or a weld grinding apparatus and technique that would rapidly and conveniently grind metallic and non-metallic materials having high tensile strengths. Therefore, it is a general object of the present invention to provide means and techniques for meeting the above described need.

Further objects and advantages will become apparent from the following detailed description of novel embodiments of the invention, particularly when considered in conjunction with the accompanying drawings wherein:

FIGURE 1 is a perspective view of a milling apparatus in accordance with the present invention;

FIGURE 2 is a rear elevation of an exemplary milling wheel for the embodiment of FIGURE 1;

FIGURE 3 is a side elevation of the milling wheel of FIGURE 2 mounted upon a mandrel;

FIGURE 4 is a cross-sectional view taken along the line 2—2 of FIGURE 2;

FIGURE 5 is another embodiment of the invention showing an apparatus particularly adapted for milling a V type weld;

FIGURE 6 shows a side elevation partially in cross-section of a milling wheel for the apparatus of FIGURE 5;

FIGURE 7 shows a half-section front elevation of the grinding wheel of FIGURE 6;

FIGURE 8 shows a half-section rear elevation of the milling wheel of FIGURE 6; and FIGURE 9 is an enlarged central cross-sectional view of the milling wheel of FIGURE 6, showing the effective cutting width of the wheel versus its actual width, substantially to scale.

Referring to the drawings, FIGURE 1 illustrates one embodiment 10 of a milling apparatus in accordance with the present invention. As shown, this apparatus 10 includes a solid tungsten carbide milling wheel 12 mounted upon a mandrel 16, which mandrel is secured in the chuck of a precision high speed motor 18. Very hard or high strength metals are rapidly removed by the rotation of the milling wheel 12 described herein against the metal at a requisite speed.

Referring to the configuration and construction of the milling wheel 12 itself, as illustrated in FIGURES 2–4, it is to be appreciated that the configuration of the wheel, including the tooth configuration, may be widely varied for different milling applications without departing from the invention, except for certain important factors which will be discussed herein. For mounting the wheel a centered bore 26 may be formed through the wheel for the mandrel 16 or for the grinding machine spindle itself, or the wheel may be bonded directly to a mandrel. The entire wheel 12 is preferably integrally formed of tungsten carbide, with teeth 14 formed in the wheel periphery by suitable means such as by grinding with diamond abrasive wheels.

Contrary to the teachings of the prior art, the wheel 12 utilizes a relatively large number of substantially closely spaced cutting teeth 14. Each tooth is preferably equidistant from each other tooth and radially spaced from the center axis of the wheel, equidistant from this axis, so that the teeth follow a concentric path as the wheel is rotated about its center axis. The preferred tooth pitch, or distance between teeth, is approximately 3/16 inch for general purpose use. Preferably the outer cutting radial edges 20 of the teeth are in a plane substantially parallel to the axis of rotation, i.e., straight or staggered rather than in a conventional helical cut.

It is to be noted that a high surface cutting speed in the range of approximately 2,500 to 12,000 surface feet per minute is essential for the successful operation of the novel carbide wheel. It is to be noted that the subject carbide wheel is preferably operated without coolant of any sort. Even without coolant the workpiece remains cool and does not develop heat generated stresses even under heavy metal removal rates. Practically all frictional heat is thrown into the chips which come off at high temperatures. Of prime importance in the new conception is the fact that these carbide wheels when operated at the requisite cutting speeds will not load or clog on either the most "sicky" non ferrous metals or the most difficult stainless steels. This action is related to the high impact and linear velocity forces of our tool. Wherever a sheared particle attempts to adhere to the cutting tooth surface or within the flute, it would be subjected to a centrifugal acceleration equal to $V^2/R$ where R is the radius of the wheel and V is the surface speed, of say 6000 ft./min. On a 1½" diameter wheel this centrifugal acceleration would be 160,000 ft./sec.$^2$ or about 5000g's. In other words the centrifugal force on this subject particle would be 5000 times its weight. In essence the above represents a novel theory of high impact milling.

It appears that the novel results of the invention are a function of the combination of the above characteristics. The unusual advantages of the rigidity and hardness of tungsten carbide are fully employed, yet its disadvantage of brittleness is overcome by a light tooth load, and clogging of the flutes is prevented. The close tooth pitch of the tool causes each tooth to take a relatively small and low pressure, low frictional "bite" yet the number of teeth and their velocity is such that the total rate of removal is very great. The feed rate of the tool is apparently only limited by the capacity of the driving motor.

*Angular grinding carbide grinding wheel*

In addition to the foregoing disclosure of the milling wheel 12 the invention includes a novel milling wheel 41 of similar principles but having an angular configuration and other features which permit the use of a smaller diameter and smaller width carbide wheel. Also it includes a fixturing means for the above angular faced wheel 41 which in combination therewith permits not only very practical utilization of the wheel to grind V grooves or weld preparation angles complete in one pass to a specified angle ground on the wheel but further to use the same degree angled wheel to mill varying weld preparation angles by variable tilting of the grinder in its fixture.

The type of wheel 41 shown in FIGURES 5–9 has a configuration not only to provide a definite and precise angular V cut or notch such as is used in weld preparation and weld routing, but also to provide carbide milling wheels in diameters much smaller than the diameters of the grinder that drives them, as may be seen in FIGURE 5. If the body of the grinder is larger than the carbide wheel itself there is no way to lower the wheel into the work. In addition to the diameter of the miller body there usually must be clearance for the operator's hands or knuckles. The novel wheel 41 enables the use of small diameter wheels and yet is able to mill definite and precise angular and radius forms into a workpiece below the main surface thereof. This angular wheel form enables the use of small diameter carbide blanks which because of their small diameter are low in cost. Further, small diameters (preferably 1″ to 3″) permit the safe operation of these tools in almost all portable air grinders.

Preferably the peripheral cutting face 46 is at an angle to the axis of rotation of the wheel, and the included angle between the radial and peripheral cutting edges is preferably an acute angle, and may be made equal to the angle formed by the groove to be ground. Thus the wheel 41 may be placed within the groove with its axis of rotation at an angle to the workpiece 62 so that each face 46 and 48 of the cutting edge 44 is parallel to sides 70 and 72 of the groove. It is preferable for safety reasons and manufacturing economy that the radial cutting face 48 be in a plane perpendicular to the axis of rotation. Preferably the length of the radial cutting face 48 is equal to the length of the peripheral cutting face 46 to provide balanced grinding. Note that the cutting face 48 is the outer radial surface, opposite the motor connection side.

FIGURE 9 shows a cross-sectional view of the milling wheel 41, in which the dimension 64 shows the actual width or thickness of the wheel. Contrasted to this is the much greater dimension 66 which is the effective cutting width of the milling wheel. To give some exemplary figures, where the angle "$a$" between the axis of rotation of the wheel and the workpiece is $37\frac{1}{2}°$ and where the angle formed between the radial and peripheral cutting edges of the wheel is $65°$, then for a wheel thickness dimension 64 of .375 inch the effective width of cut dimension 66 is .487 inch.

It can be seen that to make the same width of cut with a milling wheel designed for conventional rotation perpendicular to the work surface would require a wheel of substantially greater thickness. Since tungsten carbide is both extremely dense and very expensive, this would require a wheel of increased cost and increased danger of breakage due to increased centrifugal forces. Further, the reduced wheel thickness aids in chip removal from the notch.

*Adjustable grinder support fixture*

The adjustable support fixture 42 may be provided for use in combination with the angular carbide wheel 41, as shown in FIGURE 5. It serves to hold the angular carbide wheel 41 having a certain included angle at a precise angle for longitudinal routing or cutting of parent metal or for weld preparation and salvage. It enables the complete one pass cutting out or form milling of the workpiece to the included angle ground on the working surfaces of the carbide wheel. The fixture movement may be assisted by the fixture being supported on low-frictional means such as roller bearings 64 contacting the work surface.

Further, because of the angular and vertical adjustability of bracket part 60 by loosening nut 58, a 40° included angle carbide wheel 41 for example can be tilted to mill one side of a V groove to 45° or to other angles as may be desired. It can then be tilted in the reverse direction to mill the other side of the groove to the same angle. While this type operation requires two passes, one on each side of the groove, it does eliminate having a different included angle wheel 41 for each type of weld preparation or groove angle. As various critical and different weld preparation angles are now demanded on high reliability structures, the combination of the support fixture 42 and grinding wheel 41 meets an important need in the industry.

*Operation and summary*

The operation of carbide milling wheels with or without their fixtures characterizes one of the major advantages of the invention, that is, that rapid material removal may be accomplished with very light working pressures. For this reason, the milling apparatus 10 or the apparatus 40 may be operated as hand-held grinders.

To operate either the milling apparatus 10 or the milling apparatus 40 as a hand-held grinder, the operator simply holds the motor 18 at a hand grip 36 and at the body of the motor adjacent the hand switch 34, and presses the switch 34. The wheel quickly reaches its operating speed and may then be pressed lightly against the material to be removed. The amount of pressure will, of course, depend on the type of the material to be removed and the depth of removal desired, but it need not be more than a few pounds, and unlike a conventional milling cutter, there is no tendency for chatter, and it is not necessary to use a heavy machine. The surface left by the action of a milling wheel of the invention is smooth enough to constitute a finished surface for almost all applications, even where heavy cuts are taken.

Tungsten carbide is specified herein as the material from which the wheels 12 and 41 are to be made. Because of the fast advancement of the powdered metal art, it is intended to include in the scope of the invention under this term all similar carbide type materials, such as titanium, tantalum, and boron carbides, held together with binders such as cobalt, nickel, molybdenum, or chromium.

While a hand-operated apparatus has been described herein, it is to be appreciated that the apparatus of the invention is also particularly adaptable to operation as a fixed mechanically or hydraulically variable position set-up such as in automated machining equipment. The low work pressure requirement and the low vibration during material removal means that the heavy fixed arbors, etc., which must be used in milling are not required, and that accurate work positioning of the wheel may be accomplished by relatively lightweight and fast operating positioning means.

In view of the foregoing disclosures, it is clear that there has been provided novel grinding apparatus and methods for high-speed removal of high strength or very hard metals and non-metals, with long tool life, low work pressure, low heat generation, and smooth work finish. It is contemplated that further variations and modifications within the purview of those skilled in the art can be made herein and it is intended to cover in the appended claim all such variations and modifications as fall within the true spirit and scope of the invention.

What is claimed is:

A milling apparatus for milling a region of a workpiece which is recessed below the principal surface of said workpiece comprising: a unitary tungsten carbide wheel adapted for rotation about a central axis of rotation; a lightweight motor to which said wheel is axially secured, said motor and said wheel being adapted for rotation of said wheel under load at rotational speeds providing a surface cutting speed for said wheel in excess of 2500 feet per minute, said wheel having opposing inner and outer radial surfaces and a peripheral surface with respect to said axis of rotation, said outer radial surface and said peripheral surface forming an included angle therebetween and having integrally formed cutting teeth thereon; and support fixture means adapted to hold said motor and wheel in a fixed vertical and angular position with respect to said principal surface, said fixture means being movable parallel to said principal surface and said fixture means having means for vertically and angularly adjusting said fixed position of said motor and wheel with respect to said principal surface, said outer radial surface and said peripheral surface of said wheel being angularly formed with respect to said axis of rotation so that said recessed portion of said workpiece may be ground thereby with said motor spaced substantially above said principal surface.

References Cited by the Examiner

UNITED STATES PATENTS

| | | |
|---|---|---|
| 56,033 | 7/1866 | Frost. |
| 2,286,931 | 6/1942 | Radeke ---------- 29—103 X |
| 2,413,989 | 1/1947 | Molner et al. |
| 2,437,669 | 3/1948 | Adams. |
| 2,937,433 | 5/1960 | Rusinoff ------------ 29—103 |

WILLIAM W. DYER, JR., *Primary Examiner.*

G. A. DOST, *Assistant Examiner.*